United States Patent
Pampus et al.

(10) Patent No.: US 12,442,917 B2
(45) Date of Patent: Oct. 14, 2025

(54) METHOD FOR CLASSIFYING AT LEAST ONE OBJECT IN THE SURROUNDINGS OF A VEHICLE BY MEANS OF AN ULTRASONIC SENSOR SYSTEM, CONTROLLER, ULTRASONIC SENSOR SYSTEM, AND VEHICLE

(71) Applicant: Robert Bosch GmbH, Stuttgart (DE)

(72) Inventors: Christian Pampus, Leonberg (DE); Jannik Siller, Stuttgart (DE); Michael Tchorzewski, Boeblingen (DE); Tom Reimann, Bissingen An der Teck (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/551,253

(22) PCT Filed: Sep. 19, 2022

(86) PCT No.: PCT/EP2022/075876
§ 371 (c)(1),
(2) Date: Sep. 19, 2023

(87) PCT Pub. No.: WO2023/072477
PCT Pub. Date: May 4, 2023

(65) Prior Publication Data
US 2024/0168156 A1    May 23, 2024

(30) Foreign Application Priority Data

Oct. 26, 2021  (DE) ............ 10 2021 212 067.9

(51) Int. Cl.
*G01S 15/52*  (2006.01)
*G01S 7/539*  (2006.01)
*G01S 15/931*  (2020.01)

(52) U.S. Cl.
CPC .......... *G01S 15/52* (2013.01); *G01S 7/539* (2013.01); *G01S 15/931* (2013.01)

(58) Field of Classification Search
CPC ........ G01S 15/52; G01S 7/539; G01S 15/931; G01S 7/52; G01S 15/46; G01S 15/582;
(Continued)

(56) References Cited

U.S. PATENT DOCUMENTS

2015/0276923 A1   10/2015  Song et al.
2018/0239017 A1*   8/2018  Milschewski ............ G01S 7/53

FOREIGN PATENT DOCUMENTS

DE    102014202752 A1     9/2015
DE    102015209878 B3 *   2/2016 ........... G01S 15/104
(Continued)

OTHER PUBLICATIONS

International Search Report for PCT/EP2022/075876, Issued Jan. 2, 2023.

*Primary Examiner* — Brian A Zimmerman
*Assistant Examiner* — Anthony D Afrifa-Kyei
(74) *Attorney, Agent, or Firm* — NORTON ROSE FULBRIGHT US LLP

(57) ABSTRACT

A method for classifying at least one object in the surroundings of a vehicle using an ultrasonic sensor system. The method includes: emitting ultrasonic signals at a plurality of successive time points using the ultrasonic sensor system; and receiving ultrasonic echo signals reflected on the one or more objects in the surroundings of the vehicle, using the ultrasonic sensor system; wherein one or more objects in the surroundings are ascertained as a function of the received ultrasonic echo signals, and wherein it is determined as a function of the received ultrasonic echo signals whether the respective object is classified as dynamic, in particular as a pedestrian. A controller for operating an ultrasonic sensor
(Continued)

system, an ultrasonic sensor system, and a vehicle including such an ultrasonic sensor system are also described.

7 Claims, 2 Drawing Sheets

(58) Field of Classification Search
CPC ......... G01S 2015/937; G01S 2015/938; G01S 15/876; G01S 15/00; G01S 15/87; G01S 15/878; G01S 2015/465; G01S 15/42; G01S 15/02; G01S 15/06; G01S 2015/932; G01S 7/521; G01S 7/527; G01S 15/04
See application file for complete search history.

(56) References Cited

FOREIGN PATENT DOCUMENTS

| DE | 102015219551 | A1 | | 4/2016 | | |
|----|--------------|----|---|--------|---|---|
| DE | 102015117379 | A1 | * | 4/2017 | ............. | G01S 15/89 |
| DE | 102016118178 | A1 | | 3/2018 | | |
| DE | 102019214111 | A1 | | 3/2021 | | |
| DE | 102019215393 | A1 | | 4/2021 | | |
| EP | 3299845 | A1 | | 3/2018 | | |
| JP | 2007288460 | A | | 11/2007 | | |
| JP | 2010197342 | A | | 9/2010 | | |
| JP | 2012145444 | A | | 8/2012 | | |
| JP | 2017142735 | A | | 8/2017 | | |
| JP | 2021026557 | A | | 2/2021 | | |
| WO | 2020230231 | A1 | | 11/2020 | | |

* cited by examiner

METHOD FOR CLASSIFYING AT LEAST ONE OBJECT IN THE SURROUNDINGS OF A VEHICLE BY MEANS OF AN ULTRASONIC SENSOR SYSTEM, CONTROLLER, ULTRASONIC SENSOR SYSTEM, AND VEHICLE

FIELD

The present invention relates to methods for classifying at least one object in the surroundings of a vehicle by means of an ultrasonic sensor system.

BACKGROUND INFORMATION

In the area of driver and parking assistance systems for vehicles, ultrasonic sensor systems for sensing the vehicle surroundings are widely used. The problem with conventional ultrasonic sensor systems is their unreliable detection of poorly reflective objects and/or of objects in motion. In particular, in the conventional procedure for moving objects, it is not possible to sufficiently combine the conflicting requirements with regard to the resolution of the surroundings on the one hand and the ability of detecting moving reflection points on moving objects on the other hand. This has the result that pedestrians can only be correctly recognized at very low speeds of below 4 km/h. In order to solve the problem, an echo tracing method can be used, which, however, reaches its limits for dynamic objects with many possible possibilities for reflection. If the velocity of the object changes or if other objects are around the dynamic object, increased incorrect assignment of the echoes to the individual traces can occur. As a result, the robustness of the identification of dynamic objects likewise decreases. In addition, the developed approach is very intensive in terms of computing time since the movement direction and the movement speed are estimated, among other things.

The problems mentioned may be solved by the present invention.

SUMMARY

The present invention relates to a method for classifying at least one object in the surroundings of a vehicle by means of an ultrasonic sensor system. According to an example embodiment of the present invention, the method comprises the following steps:
  emitting ultrasonic signals at a plurality of successive time points by means of the ultrasonic sensor system, and
  receiving ultrasonic echo signals, in particular ultrasonic echo signals reflected on the one or more objects in the surroundings of the vehicle, by means of the ultrasonic sensor system,
  wherein one or more objects in the surroundings are ascertained as a function of the received ultrasonic echo signals, and
  wherein it is determined as a function of the received ultrasonic echo signals whether the respective object is classified as dynamic, in particular as a pedestrian.

It is advantageous here that interventions in the object formation do not take place, but that properties on the echo level are evaluated and these properties are propagated to all already created objects in a certain area around the vehicle. This makes it possible to quickly and easily recognize and classify dynamic objects. In addition, the requirements with respect to the dynamics can be realized and the transverse effects. such as an unstable object position in the case of static objects or incorrect classification as a result of incorrect localization, can be kept low.

An object can be understood to be any object outside the vehicle, in particular including pedestrians or cyclists. The term "dynamically classified" is understood here to mean that an object is moving and, in particular, moving non-uniformly, wherein it may be moving toward the vehicle. This is true, for example, for a pedestrian but also for an animal or a cyclist.

The vehicle can, for example, be a passenger car, a truck, or also a two-wheeler, which is in particular motorized.

Everything outside of the actual vehicle geometry, e.g., the road in front of the vehicle, can be understood as the surroundings of the vehicle.

For emitting the ultrasonic signals or receiving the ultrasonic echo signals, the ultrasonic sensor system in particular comprises at least one ultrasonic transceiver.

One example embodiment of the present invention provides that direct echoes of at least one ultrasonic transceiver of the ultrasonic sensor system are used in ascertaining and classifying the respective object and/or one or more cross echoes of at least two ultrasonic transceivers of the ultrasonic sensor system are used in ascertaining and classifying the respective object.

It is advantageous that as quick and error-free a result as possible with regard to objects in the surroundings of the vehicle as well as their distance from the vehicle can be obtained by means of direct echoes. On the other hand, a particularly high angular resolution in the object or distance determination can be enabled by means of cross echoes. For example, a combination of the two methods may help to distinguish between point obstacles and wall obstacles.

An example embodiment of the present invention provides that a distance change that takes place between the vehicle and the respectively ascertained object within a time span of two ultrasonic signals emitted at different time points is determined as a function of ultrasonic echo signals associated with these ultrasonic signals, wherein it is determined as a function of the distance change and a velocity of the vehicle whether the respective object can be classified as dynamic.

It is advantageous that incorrect classifications can be reduced. This is because in the case of a dynamic object, such as a pedestrian, due to the object's own movement, the received ultrasonic echo signal (first reflection) approaches the vehicle more quickly than the vehicle's own speed. Accordingly, as a function of the echo information, the speed of approach of the object relative to the vehicle is taken into account as a property of this echo information.

The term "distance change" is understood here to mean the difference between the distance sensed from the vehicle to the object at two different time points. For example, if the vehicle is 100 cm away from the object at a first time point and only 98 cm away at a second time point, the distance change is 2 cm. The distance change consequently describes the approach path between the object and the vehicle during the time span between the two different measurement time points.

A further example embodiment of the present invention provides that a comparison of the distance change to a path, traveled by the vehicle within the time span as a function of the velocity of the vehicle, takes place, wherein the object is classified as dynamic if the distance change is greater than the path traveled.

It is advantageous that this is a simple method of using the speed of approach of the object for the classification.

According to one example embodiment of the present invention, it is provided that the classification of the object takes into account whether multiple reflections are received from the one object.

It is advantageous that dynamic objects, such as pedestrians, have different possibilities for reflection for corresponding ultrasonic signals through the garments as well as the body posture, which possibilities for reflection can be identified as reflections upon a single transmission of an ultrasonic signal by receiving a plurality of ultrasonic echo signals and, as a result of which, this can be taken into account in the classification as a property from the ultrasonic echo signals.

In this case, the ultrasonic signal echoes from different time points or different ultrasonic signals emitted can in particular also be compared to one another in order to confirm the multiple reflections on the corresponding object. If these multiple reflections approximate one another substantially uniformly, it is to be assumed that they originate from a single object.

According to a further example embodiment of the present invention, it is provided that the ultrasonic sensor system comprises a plurality of ultrasonic transceivers, wherein the ultrasonic transceiver with the highest information quality taken into account for the classification, in particular with the received ultrasonic echo signals with the most multiple reflections, is determined and a monitoring area is defined around this ultrasonic transceiver, within which monitoring area the ultrasonic echo signals are evaluated.

It is advantageous that the highly relevant areas around the vehicle are in particular monitored in order to be able to quickly and simply implement a corresponding classification of a dynamic object. As a result of the restriction to an area or corresponding ultrasonic transceivers, the time required for classification can be optimized and incorrect classifications can also be avoided.

In this respect, a monitoring area is understood to be a sub-area of the surroundings of the vehicle that is in particular in close proximity to the ultrasonic transceiver or ultrasonic transceiver pair that is relevant depending on the direct or cross echo operation and in particular receives the most multiple reflections.

The term "highest information quality" is understood here to mean the information content that enables classification of the object with the highest probability. In this respect, the multiple reflections can in particular provide an indication of a dynamic object, which is why it is precisely the ultrasonic transceivers with many received multiple reflections that should be increasingly evaluated.

The present invention also relates to a controller for operating an ultrasonic sensor system for classifying at least one object in the surroundings of a vehicle, wherein the controller is configured to operate the ultrasonic sensor system according to a method according to the present invention. The controller can, for example, be designed as a microcontroller.

In addition, the present invention relates to an ultrasonic sensor system, in particular for classifying an object in the surroundings of a vehicle, comprising at least one ultrasonic transceiver and a controller according to the present invention.

Furthermore, the present invention relates to a vehicle, in particular to a passenger car, comprising an ultrasonic sensor system according to the present invention.

DETAILED DESCRIPTION OF EXAMPLE EMBODIMENTS

Figure 1:
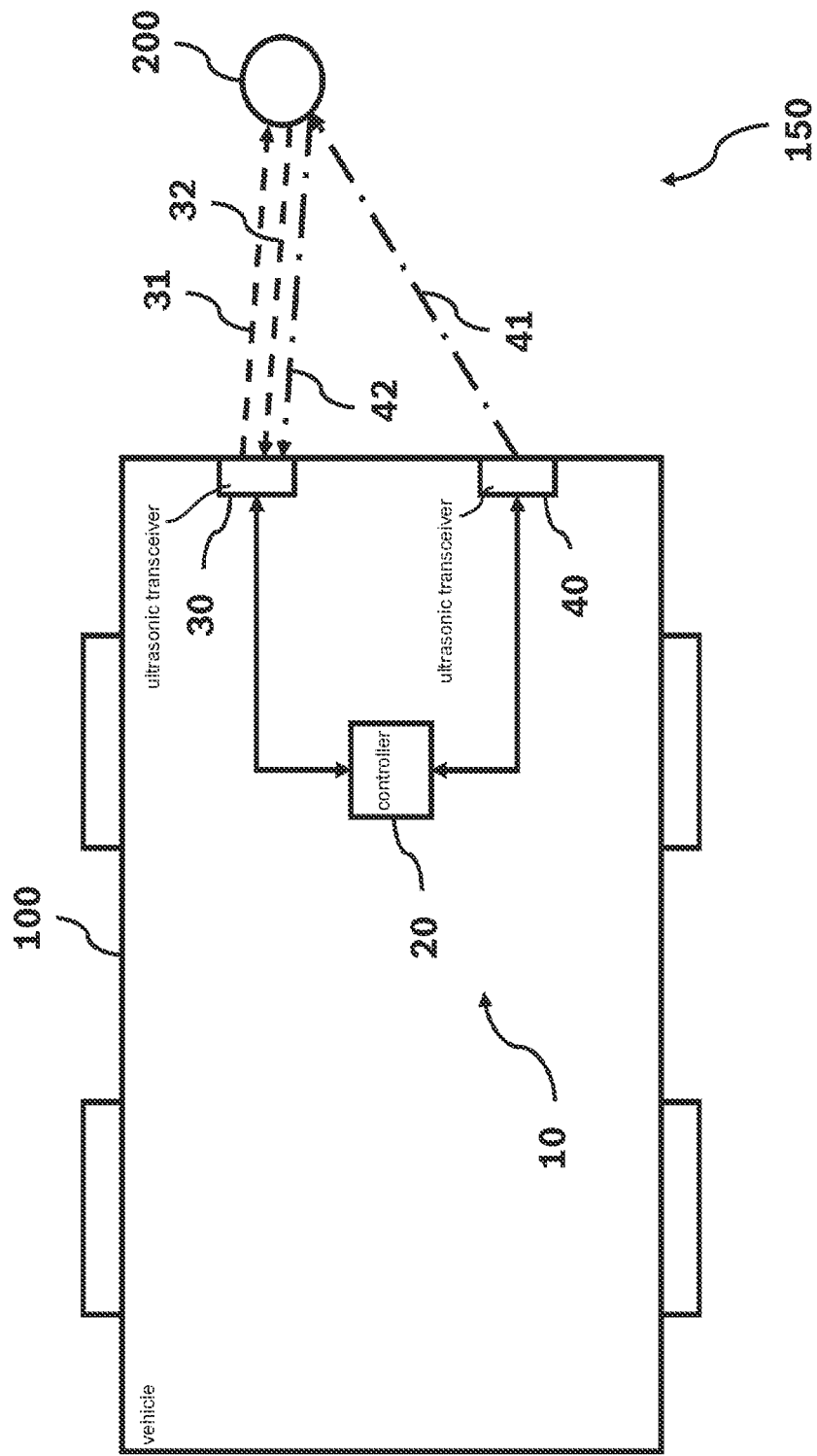
FIG. 1 shows, in schematic form, a vehicle designed according to the present invention using an example embodiment of the ultrasonic sensor system according to the present invention, which can be controlled on the basis of the method according to the present invention.

FIG. 1 shows, in schematic form, a vehicle designed according to the present invention using an example embodiment of the ultrasonic sensor system according to the present invention, which can be controlled on the basis of the method according to the present invention.

Shown is a schematic plan view of a vehicle 100, e.g., a passenger car, which is designed according to the present invention and is formed with an embodiment of the ultrasonic sensor system 10 according to the present invention.

For example, the ultrasonic sensor system 10 according to the present invention may comprise an ultrasonic transceiver 30 and an ultrasonic transceiver 40 as well as a controller 20 for controlling the operation of the ultrasonic sensor system 10. Via one or more sensing and control lines, the controller 20 is connected to the ultrasonic transceiver 30 and the ultrasonic transceiver 40. In this way, the controller 20 can respectively control the operation of the ultrasonic transceivers 30, 40 and/or query the status thereof or receive or actively retrieve corresponding data or signals from ultrasonic transceivers 30, 40.

The controller 20 is formed and comprises means that enable both the operation of transmission via the ultrasonic transceivers 30, 40 and the reception via the ultrasonic transceivers 30, 40 in the manner according to the present invention. For this purpose, corresponding means for storing, processing, and evaluating received ultrasonic echo signals 32, 42 can be provided, which are not shown in detail here.

The ultrasonic sensor system 10 is in particular configured to emit ultrasonic signals 31, 41 at a plurality of successive time points and in particular to receive ultrasonic echo signals 32, 42 reflected on the one or more objects 200 in the surroundings 150 of the vehicle 100. Furthermore, the ultrasonic sensor system 10 is configured to ascertain one or more objects 200 in the surroundings 150 of the vehicle 100 as a function of the received ultrasonic echo signals 32, 42 and to also determine as a function of the received ultrasonic echo signals 32, 42 whether the respective object 200 is classified as dynamic, in particular as a pedestrian.

The ultrasonic transceiver 30 can in this case be operated as an ultrasonic transmitter for emitting the ultrasonic signal 31 in a first time period, whereas this ultrasonic transceiver 30 is operated as an ultrasonic receiver in a subsequent second time period in order to receive the ultrasonic echo signal 32 as a direct echo.

Additionally, or alternatively, the ultrasonic transceiver 40 can act as an ultrasonic transmitter and thus emit an ultrasonic signal 41 as the transmit signal. In this case, the ultrasonic transceiver 30 can act as an ultrasonic receiver in order to receive the ultrasonic echo signal 42. Thus, in this configuration, a so-called cross echo is ascertained, in the case of which a first transceiver emits the ultrasonic signal 41 and a second transceiver receives the ultrasonic echo signal 42.

In an exemplary embodiment not shown in the figures, the ultrasonic transceiver 40 can also act in direct echo operation.

Furthermore, in an exemplary embodiment not shown in the figures, the ultrasonic transceiver 30 can emit an ultrasonic signal, which is received by the ultrasonic transceiver 40, thereby enabling a corresponding cross echo operation. The combination of direct echo operation and cross echo operation can consequently be selected as desired, wherein at least two ultrasonic transceivers 30, 40 must be present in the case of cross echo operation.

In particular, the ultrasonic sensor system 10 is configured to determine a distance change ΔX that takes place between the vehicle 100 and the respectively ascertained object 200 within a time span of two ultrasonic signals 31, 41 emitted at different time points, as a function of ultrasonic echo signals 32, 42 associated with these ultrasonic signals 31, 41, and to determine as a function of the distance change ΔX and a velocity of the vehicle 100 whether the respective object 200 can be classified as dynamic. In this case, a comparison of the distance change ΔX to a path, traveled by the vehicle 100 within the time span as a function of the velocity of the vehicle 100, can in particular take place, wherein the object 200 is classified as dynamic if the distance change ΔX is greater than the path traveled by the vehicle 100.

Furthermore, the ultrasonic sensor system 10 can be configured to take into account in the classification of the object 200 whether multiple reflections are received from the one object 200.

As shown here, if the ultrasonic sensor system 10 comprises a plurality of ultrasonic transceivers 30, 40, the ultrasonic sensor system 10 may also be configured to determine the ultrasonic transceiver 30, 40 with the highest information quality taken into account in the classification, in particular with the received ultrasonic echo signals with the most multiple reflections, and to define a monitoring area around this respective ultrasonic transceiver 30, 40, within which monitoring area the ultrasonic echo signals 32, 42 are evaluated.

Figure 2:
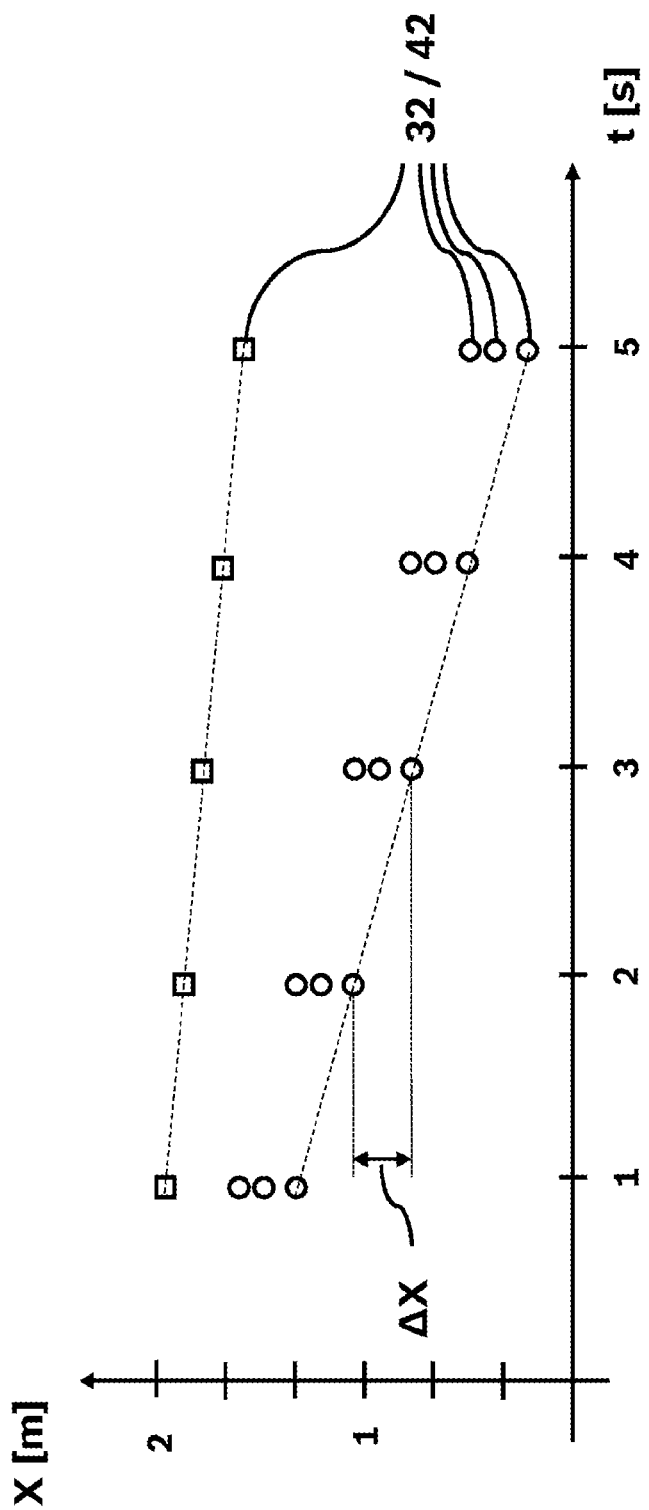
FIG. 2 shows a graph of the distance curves of a vehicle relative to two objects over time based on respectively received ultrasonic echo signals.

FIG. 2 shows a graph of the distance curves of a vehicle relative to two objects over time based on respectively received ultrasonic echo signals.

The time t in seconds is plotted on the abscissa. On the ordinate, the distance X between the vehicle 100 and a respective object is plotted, which distance can be determined from corresponding ultrasonic echo signals 31, 41. In particular, two objects are included in the graph, wherein the distance from the first object is shown as quadrilaterals and the distance from the second object is shown as circles. The distance curve shown is determined by emitting ultrasonic signals 31, 41 at a plurality of successive time points by means of the ultrasonic sensor system 10 and by receiving ultrasonic echo signals 32, 42 reflected on the corresponding objects, by means of the ultrasonic sensor system 10.

It can be clearly seen that the second object has multiple reflections, which is an indication of a dynamic object and in particular of a pedestrian.

It can also be seen that the second object approaches the vehicle 100 more quickly than the first object since the distance between the vehicle 100 and the second object decreases more quickly than the distance between the vehicle 100 and the first object over the same time duration. If the speed of approach of the second object to the vehicle 100 is faster than the speed of the vehicle 100, i.e., the distance change ΔX between two successively sensed distances X is greater than a path traveled by the vehicle 100 during this time span, a dynamic object that moves toward the vehicle 100 can again be assumed. On the other hand, if the speed of approach of the first object is equal to the vehicle speed, it can be assumed that the first object is a static object.

The invention claimed is:

1. A method for classifying at least one object in surroundings of a vehicle using an ultrasonic sensor system, the method comprising the following steps:
   emitting ultrasonic signals at a plurality of successive time points using the ultrasonic sensor system;
   receiving ultrasonic echo signals reflected on the object in the surroundings of the vehicle, using the ultrasonic sensor system;
   ascertaining the object in the surroundings as a function of the received ultrasonic echo signals; and
   determining, as a function of the received ultrasonic echo signals whether the object is classified as dynamic including as a pedestrian;
   wherein a distance change that takes place between the vehicle and the ascertained object within a time space of two ultrasonic signals emitted at different time points is determined as a function of ultrasonic echo signals associated with the two ultrasonic signals, wherein it is determined as a function of the distance change and a velocity of the vehicle whether the object can be classified as dynamic, wherein a comparison of the distance change to a path traveled by the vehicle within the time span as a function of the velocity of the vehicle, takes place, and wherein the object is classified as dynamic when the distance change is greater than the path traveled.

2. The method according to claim 1, wherein direct echoes from at least one ultrasonic transceiver of the ultrasonic sensor system are used in the ascertaining and classifying the object, and/or one or more cross echoes of at least two ultrasonic transceivers of the ultrasonic sensor system are used in the ascertaining and classifying the respective object.

3. The method according to claim 1, wherein it is taken into account in the classification of the object whether multiple reflections are received from the object.

4. The method according to claim 3, wherein the ultrasonic sensor system includes a plurality of ultrasonic transceivers, wherein a ultrasonic transceiver of the ultrasonic transceivers with a highest information quality taken into account for the classification, with the received ultrasonic echo signals with a highest number of multiple reflections, is determined and a monitoring area is defined around the ultrasonic transceiver, within which monitoring area the ultrasonic echo signals are evaluated.

5. A controller configured to operate an ultrasonic sensor system for classifying at least one object in surroundings of a vehicle using the ultrasonic sensor system, the controller being configured to:
   emit ultrasonic signals at a plurality of successive time points using the ultrasonic sensor system;
   receive ultrasonic echo signals reflected on the object in the surroundings of the vehicle, using the ultrasonic sensor system;
   ascertain the object in the surroundings as a function of the received ultrasonic echo signals; and
   determine, as a function of the received ultrasonic echo signals whether the object is classified as dynamic including as a pedestrian;
   wherein a distance change that takes place between the vehicle and the ascertained object within a time space of two ultrasonic signals emitted at different time points is determined as a function of ultrasonic echo signals associated with the two ultrasonic signals, wherein it is determined as a function of the distance change and a velocity of the vehicle whether the object can be classified as dynamic, wherein a comparison of the distance change to a path traveled by the vehicle within the time span as a function of the velocity of the vehicle, takes place, and wherein the object is classified as dynamic when the distance change is greater than the path traveled.

6. An ultrasonic sensor system configured to classify an object in surroundings of a vehicle, comprising:
   at least one ultrasonic transceiver; and
   a controller configured to operate the ultrasonic sensor system, the controller being configured to:
      emit ultrasonic signals at a plurality of successive time points using the ultrasonic sensor system,
      receive ultrasonic echo signals reflected on the object in the surroundings of the vehicle, using the ultrasonic sensor system,
      ascertain the object in the surroundings as a function of the received ultrasonic echo signals, and
      determine, as a function of the received ultrasonic echo signals whether the object is classified as dynamic including as a pedestrian;
      wherein a distance change that takes place between the vehicle and the ascertained object within a time space of two ultrasonic signals emitted at different time points is determined as a function of ultrasonic echo signals associated with the two ultrasonic signals, wherein it is determined as a function of the distance change and a velocity of the vehicle whether the object can be classified as dynamic, wherein a comparison of the distance change to a path traveled by the vehicle within the time span as a function of the velocity of the vehicle, takes place, and wherein the object is classified as dynamic when the distance change is greater than the path traveled.

7. A passenger car, comprising:
   an ultrasonic sensor system configured to classify an object in surroundings of a the passenger car, the ultrasonic sensor system including:
   at least one ultrasonic transceiver; and
   a controller configured to operate the ultrasonic sensor system, the controller being configured to:
      emit ultrasonic signals at a plurality of successive time points using the ultrasonic sensor system,
      receive ultrasonic echo signals reflected on the object in the surroundings of the vehicle, using the ultrasonic sensor system,
      ascertain the object in the surroundings as a function of the received ultrasonic echo signals, and
      determine, as a function of the received ultrasonic echo signals whether the object is classified as dynamic including as a pedestrian;
      wherein a distance change that takes place between the vehicle and the ascertained object within a time space of two ultrasonic signals emitted at different time points is determined as a function of ultrasonic echo signals associated with the two ultrasonic signals, wherein it is determined as a function of the distance change and a velocity of the vehicle whether the object can be classified as dynamic, wherein a comparison of the distance change to a path traveled by the vehicle within the time span as a function of the velocity of the vehicle, takes place, and wherein the object is classified as dynamic when the distance change is greater than the path traveled.

* * * * *